United States Patent
Zeng et al.

(10) Patent No.: US 11,380,964 B2
(45) Date of Patent: Jul. 5, 2022

(54) WOUND ELECTRODE ASSEMBLY

(71) Applicant: Ningde Amperex Technology Limited, Fujian (CN)

(72) Inventors: Qiao Zeng, Fujian (CN); Kefei Wang, Fujian (CN); Liangzhen Xiao, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 120 days.

(21) Appl. No.: 16/430,409

(22) Filed: Jun. 3, 2019

(65) Prior Publication Data

US 2020/0168873 A1     May 28, 2020

(30) Foreign Application Priority Data

Nov. 22, 2018    (CN) .......................... 201811400165.2

(51) Int. Cl.
*H01M 50/46*     (2021.01)
*H01M 10/04*     (2006.01)

(52) U.S. Cl.
CPC ..... *H01M 50/461* (2021.01); *H01M 10/0431* (2013.01)

(58) Field of Classification Search
CPC ............ H01M 50/40–461; H01M 10/04–0431
See application file for complete search history.

(56) References Cited

U.S. PATENT DOCUMENTS

| | | | |
|---|---|---|---|
| 2014/0099525 A1* | 4/2014 | Kwon | H01M 10/0431 429/94 |
| 2018/0034028 A1* | 2/2018 | Jung | H01M 10/052 |

FOREIGN PATENT DOCUMENTS

| | | |
|---|---|---|
| CN | 103765665 A | 4/2014 |
| CN | 205355186 U | 6/2016 |
| CN | 106159332 A | 11/2016 |
| CN | 107925114 A | 4/2018 |

OTHER PUBLICATIONS

Office Action, CN201811400165.2, dated Jun. 3, 2021, 8 pgs.

* cited by examiner

*Primary Examiner* — Cynthia H Kelly
*Assistant Examiner* — Niara Trant
(74) *Attorney, Agent, or Firm* — Morgan, Lewis & Bockius LLP

(57) ABSTRACT

The embodiments of the present application provides a wound electrode assembly formed by winding a first electrode sheet, a second electrode sheet, and an isolating membrane disposed therebetween. The wound electrode assembly includes: a first surface having a first protrusion in the thickness direction of the wound electrode assembly; a first wound electrode assembly; a second wound electrode assembly wrapping the first wound electrode assembly, the first wound electrode assembly and the second wound electrode assembly sharing the first electrode sheet and the second electrode sheet; an adhesive layer disposed between the first electrode sheet and the isolating membrane, and/or between the second electrode sheet and the isolating membrane. The purpose of the present application is at least to provide a wound electrode assembly capable of reducing the risk of misalignment of the internal structures of the electrode assembly during the falling, and retaining the shape of the electrode assembly.

19 Claims, 10 Drawing Sheets

WOUND ELECTRODE ASSEMBLY

CROSS REFERENCE

This application claims priority to and benefits from Chinese Patent Application No. 201811400165.2, filed on Nov. 22, 2018, and the entire content of which is incorporated herein by reference.

FIELD OF THE APPLICATION

The present application relates to the field of battery, in particular, to a wound electrode assembly.

BACKGROUND OF THE APPLICATION

Since the arrangement of many electronic components in a mobile electronic device often exhibits a step shape or other irregular shape, the space reserved for the battery is not always a regular rectangular parallelepiped. Stepped electrode assemblies have been widely used, and the stepped electrode assemblies can effectively improve the ED (energy density) for a unique reserved space. However, due to the special structure of the stepped electrode assembly, there is a problem of misalignment between the electrode sheets of the stepped electrode assembly.

SUMMARY OF THE APPLICATION

In view of one of the problems in the background art, the purpose of the present application is to provide a wound electrode assembly capable of reducing the risk of misalignment of the internal structures of the electrode assembly during the falling.

The technical solution of the present application is implemented as follows:

According to an embodiment of the present application, a wound electrode assembly is provided. The wound electrode assembly is formed by winding a first electrode sheet, a second electrode sheet, and an isolating membrane disposed therebetween, the wound electrode assembly includes: a first surface having a first protrusion in a thickness direction of the wound electrode assembly; a first wound electrode assembly; a second wound electrode assembly wrapping the first wound electrode assembly, the first wound electrode assembly and the second wound electrode assembly sharing the first electrode sheet and the second electrode sheet; an adhesive layer disposed between the first electrode sheet and the isolating membrane, and/or between the second electrode sheet and the isolating membrane.

According to an embodiment of the present application, the adhesive layer provides an adhesive force in the range of 4 N/m to 12 N/m.

According to an embodiment of the present application, the wound electrode assembly further includes: a protective adhesive layer, wherein the second wound electrode assembly is different in shape from the first wound electrode assembly in a first region, and the protective adhesive layer is disposed at least in the first region.

According to an embodiment of the present application, in the first region, the second electrode sheet of the second wound electrode assembly is different in shape from the first electrode sheet of the first wound electrode assembly, and the protective adhesive layer is disposed between the second electrode sheet of the second wound electrode assembly and the first electrode sheet of the first wound electrode assembly.

According to an embodiment of the present application, an electrode tab of the wound electrode assembly is located in the first protrusion in a thickness direction of the wound electrode assembly, wherein the first electrode sheet and the second electrode sheet both include a starting segment and a winding segment, the electrode tab is disposed in the winding segment of at least one of the first electrode sheet and the second electrode sheet, and at least one of the first electrode sheet and the second electrode sheet includes a plurality of electrode tabs.

According to an embodiment of the present application, the wound electrode assembly further including a third wound electrode assembly wrapping the second wound electrode assembly, wherein the second wound electrode assembly including a first flat portion, a second protrusion is located on a surface of the first protrusion away from the first flat portion, and the first protrusion is located between the first flat portion and the second protrusion; wherein the third wound electrode assembly is different in shape from the second wound electrode assembly in a second region, and the protective adhesive layer is disposed in the second region.

According to an embodiment of the present application, the wound electrode assembly further includes: a second surface disposed opposite to the first surface and having a third protrusion.

According to an embodiment of the present application, the first protrusion is disposed corresponding to the third protrusion in a width direction of the wound electrode assembly.

According to an embodiment of the present application, the first protrusion is located at a center of the wound electrode assembly in the width direction of the wound electrode assembly.

According to an embodiment of the present application, the first protrusion is located at either end of the wound electrode assembly in the width direction of the wound electrode assembly.

With the above technical solution of the present application, the first protrusion is configured to be integrated as a portion of the wound electrode assembly, which reduces the risk of misalignment of the first protrusion during the falling of the wound electrode assembly. In addition, an adhesive layer is disposed between the first electrode sheet and the isolating membrane, and/or between the second electrode sheet and the isolating membrane, which further reduces the misalignment between the electrode sheets of the wound electrode assembly, and improves the shape retention of the wound electrode assembly.

BRIEF DESCRIPTION OF THE ACCOMPANYING DRAWINGS

In order to illustrate the technical schemes in the embodiments of the present disclosure or in the prior art more clearly, the drawings which are required to be used in the description of the embodiments of the present disclosure are briefly described below. It is obvious that the drawings described below are only some embodiments of the present disclosure. It is obvious to those of ordinary skill in the art that other drawings may be obtained based on the accompanying drawings without inventive effort.

FIGS. 1 and 2 are structural schemes of a wound electrode assembly of the related art;

FIGS. 3*a* to 3*c* are structural schemes of a wound electrode assembly according to various embodiments of the present application;

DETAILED DESCRIPTION

Figure 1:
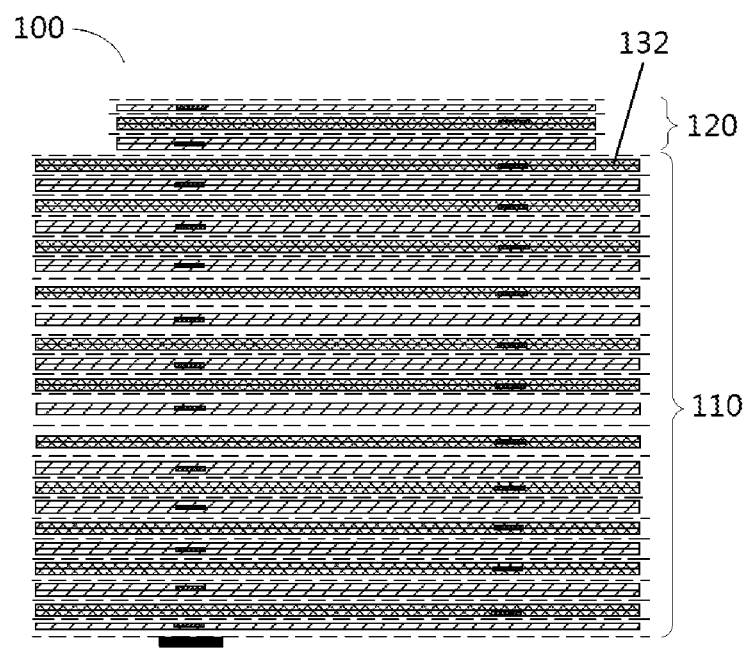

The technical solutions of the embodiments of the present disclosure will be clearly and completely described in the following with reference to the accompanying drawings. It is obvious that the embodiments to be described are only a part of the present disclosure rather than all of the embodiments. All other embodiments obtained by persons skilled in the art based on the embodiments of the present disclosure without creative efforts shall fall within the protection scope of the present disclosure. Based on the embodiments of the present application, all the other embodiments obtained by those of ordinary skill in the art are within the scope of the present application.

The embodiments of the present application will be specifically described below in combination with the accompanying drawings. Specifically, the features defined by "a first" or "a second" can explicitly or implicitly include one or more features. In this application, unless otherwise stated, the term "a plurality of" means two or more. It should be noted that the following various embodiments may be combined or partially replaced with each other in any possible manner. Also, like components in the various drawings of the present application have the same reference numerals.

As shown in FIG. 1, a laminated structure is implemented in the stepped electrode assembly 100 of the related art. Only a portion of the body portion 110 of the stepped electrode assembly 100 is connected to the stepped portion 120, causing a portion of the anode 132 of the body portion 110 to be exposed. The exposed portion of the anode 132 may be at a risk of corrosion, and the electrode sheets are easily misaligned, and the stepped shape may not be easily maintained.

Figure 2:
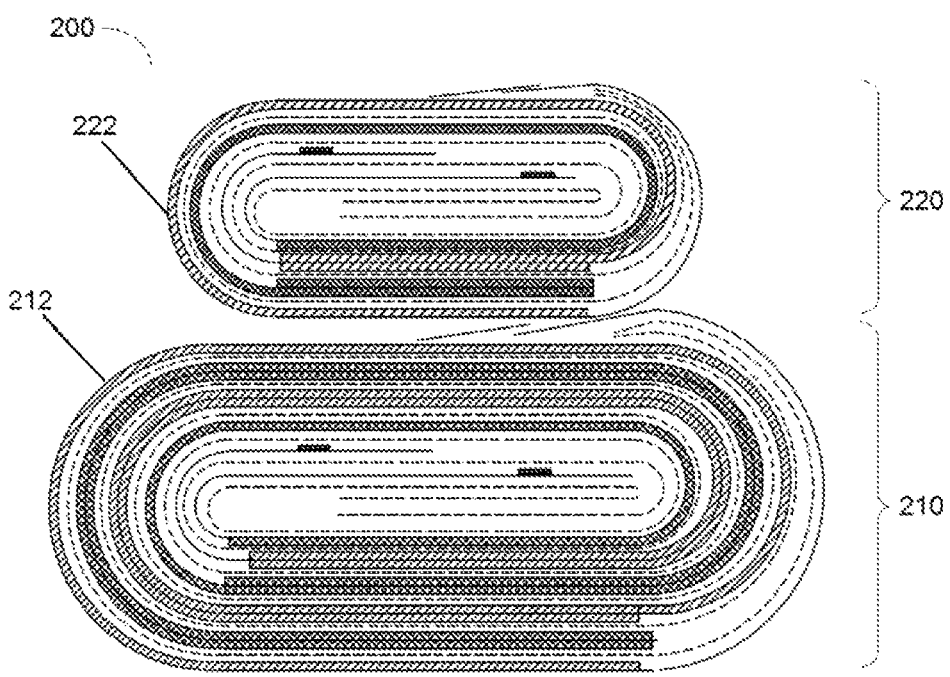

As shown in FIG. 2, two wound electrode assemblies 212, 222 stacked are implemented in another stepped electrode assembly 200 of the related art, one wound electrode assembly 212 is the body portion 210 and the other wound electrode assembly 222 is the stepped portion 220. Since the stepped portion 220 and the body portion 210 are relatively independent, there is a risk of misalignment between them during the falling process, and the stepped shape is also difficult to maintain.

Figure 3A:
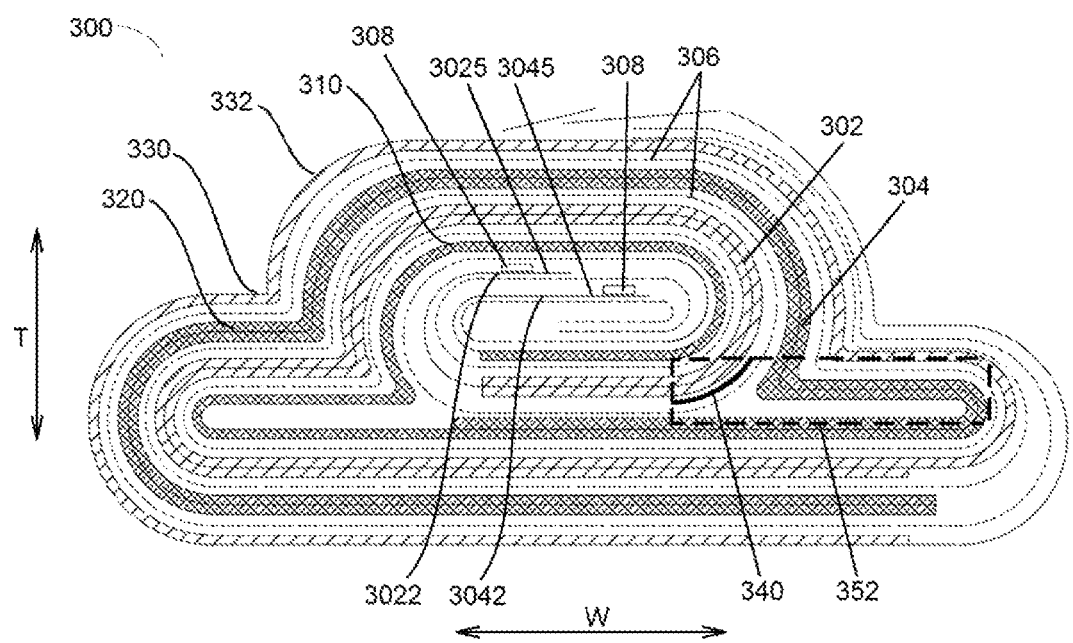

As shown in FIG. 3a, the wound electrode assembly 300 is formed by winding a first electrode sheet 302, a second electrode sheet 304, and an isolating membrane 306 therebetween. The wound electrode assembly 300 includes a first wound electrode assembly 310 and a second wound electrode assembly 320 wrapping the first wound electrode assembly 310, the first wound electrode assembly 310 and the second wound electrode assembly 320 share the first electrode sheet 302 and the second electrode sheet 304. The wound electrode assembly 300 also has a first surface 330 which has a first protrusion 332 extending in a thickness direction T of the wound electrode assembly 300. The wound electrode assembly 300 further includes an adhesive layer. In an embodiment, the adhesive layer is disposed between the first electrode sheet 302 and the isolating membrane 306. In an embodiment, the adhesive layer is disposed between the second electrode sheet 304 and the isolating membrane 306. In an embodiment, the adhesive layer is disposed between the first electrode sheet 302 and the isolating membrane 306, and between the second electrode sheet 304 and the isolating membrane 306. The material of the adhesive layer may include any suitable adhesive material, which may be polyvinylidene fluoride (PVDF), a polyacrylate material, or the like. By providing an adhesive layer between the first electrode sheet 302 and/or the second electrode sheet 304 and the isolating membrane 306 of the wound electrode assembly 300, the wound electrode assembly 300 is capable of maintaining a good profiled state (e.g., during the formation of the wound electrode assembly).

Figure 5:
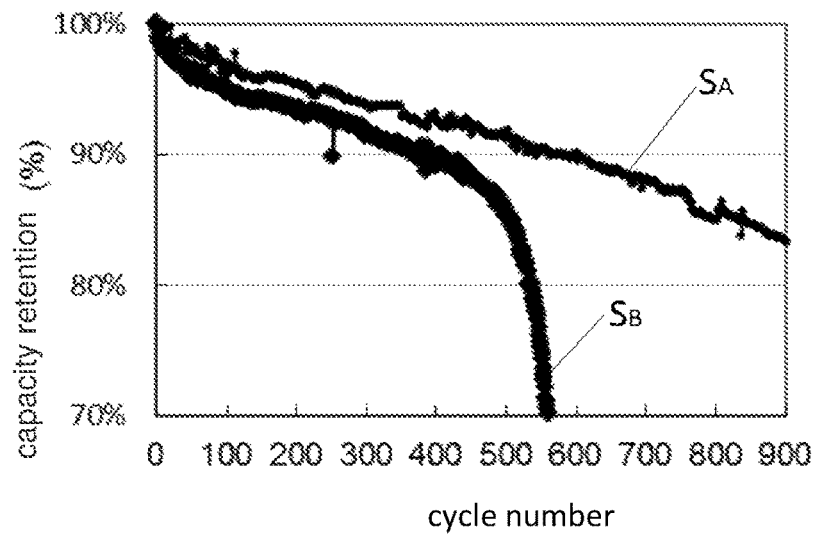
FIG. 5 is a curve showing cycle life of adhesive forces of 6 N/m and 15 N/m, respectively, provided by an adhesive layer of a wound electrode assembly according to an embodiment of the present application.

In some embodiments, an adhesive force is provided by the adhesive layer in the range of 4 N/m to 12 N/m. That is, the adhesive force between the isolating membrane 306 to the first electrode sheet 302 and/or the second electrode sheet 304 is in the range of 4 N/m to 12 N/m. If the adhesive force provided by the adhesive layer is too small, it is insufficient to maintain the wound electrode assembly in a good profiled state. If the adhesive force is too large, it may affect the infiltration of the electrolyte, thereby affecting the cycle life of the wound electrode assembly. As shown in FIG. 5, a cycle life curve $S_A$ in which the adhesive layer provides an adhesive force of 6 N/m and a cycle life curve $S_B$ in which the adhesive layer provides an adhesive force of 15 N/m are illustrated.

With the above technical solution of the present application, by configuring the first protrusion 332 to be integrated as a portion of the wound electrode assembly 300, the risk of misalignment for the first protrusion 332 during the falling of the wound electrode assembly 300 is reduced, and the risk of corrosion for first electrode sheet 302 and second electrode sheet 304 is reduced. In addition, by providing a protective adhesive layer 340 in the first regions 352, where the first wound electrode assembly 310 has a structure different from that of the second wound battery 320. Thus, the safety reliability of the wound electrode assembly is improved.

Specifically, when the first electrode sheet 302 is a positive electrode sheet, the second electrode sheet 304 is a negative electrode sheet, and when the first electrode sheet 302 is a negative electrode sheet, the second electrode sheet 304 is a positive electrode sheet. The isolating membrane 306 is disposed between the positive electrode sheet and the negative electrode sheet to provide insulation. The isolating membrane 306 may be formed of polyethylene, polypropylene or a combination thereof.

Figure 3B:
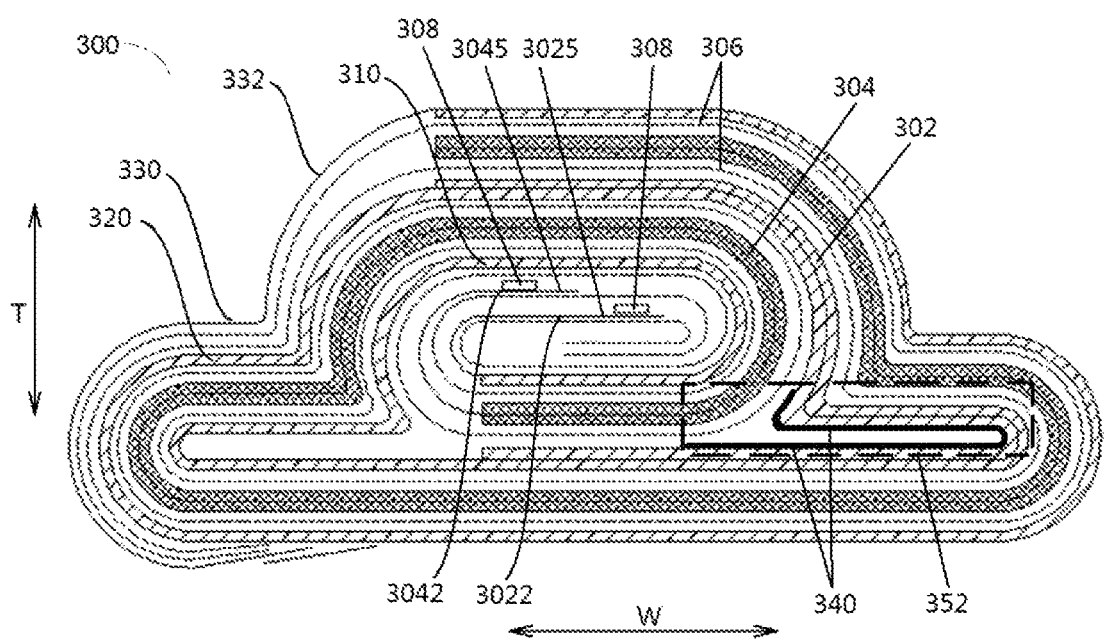
Figure 3C:
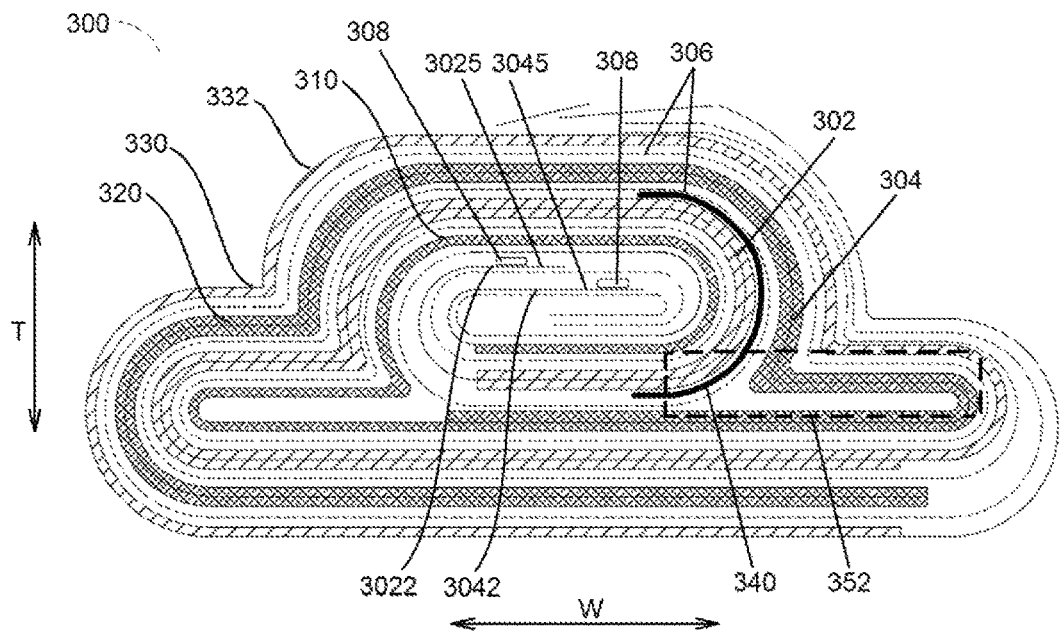
Figure 4A:
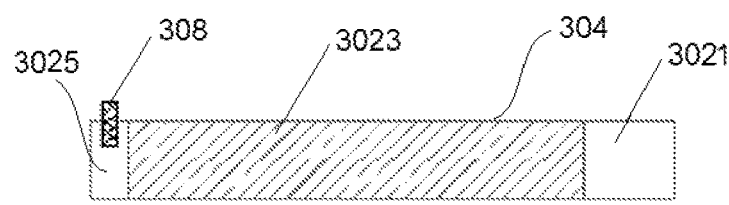
FIGS. 4a and 4b are structural schemes of two surfaces of a first electrode sheet of wound electrode assembly according to an embodiment of the present application.
Figure 4B:
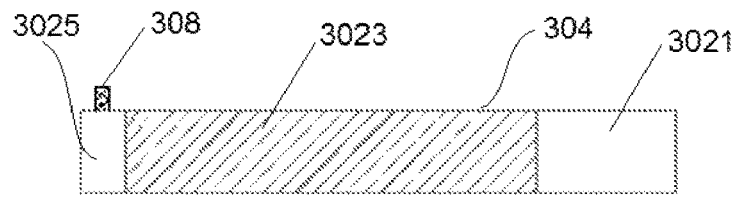
Figure 4C:
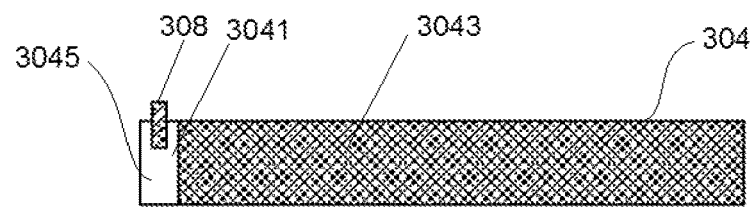
FIGS. 4c and 4d are structural schemes of two surfaces of a second electrode sheet of wound electrode assembly according to an embodiment of the present application.
Figure 4D:
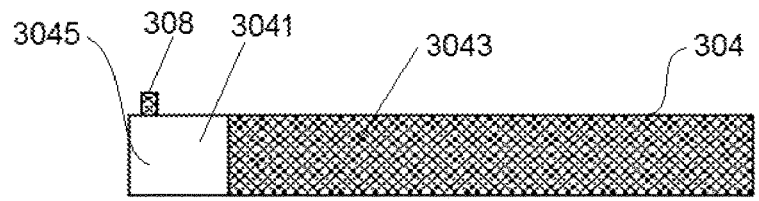

With reference to FIGS. 3a through 3c, in a first region 352, the second wound electrode assembly 320 is different from the first wound electrode assembly 310 in shape. Specifically, the wound electrode assembly 300 further includes a protective adhesive layer 340 disposed at least within the first region 352. The phenomenon of lithium precipitation in the first region 352 may be prevented by providing the protective adhesive layer 340.

As shown in FIG. 3a, in the first region 352, the second electrode sheet 304 of the second wound electrode assembly 320 protrudes toward the outside of the wound electrode assembly 300 in the width direction W of the wound electrode assembly 300, so that the second electrode sheet 304 of the second wound electrode assembly 320 is different in shape from the first electrode sheet 302 of the first wound electrode assembly 310. The protective adhesive layer 340 is disposed between the second electrode sheet 304 of the second wound electrode assembly 320 and the first electrode sheet 302 of the first wound electrode assembly 310. In the present embodiment, the first electrode sheet 302 is a negative electrode sheet, and the second electrode sheet 304 is a positive electrode sheet. In the first region 352, the first electrode sheet 302 is closer to the inside of the wound electrode assembly 300 than the second electrode sheet 304, that is, the negative electrode sheet is closer to the inside of the wound electrode assembly 300 than the positive electrode sheet. Specifically, the protective adhesive layer 340 is in direct contact with and extends along the first electrode sheet 302 of the first wound electrode assembly 310, that is, the protective adhesive layer 340 is in direct contact with and extends along the negative electrode sheet.

As shown in FIG. 3b, in the first region 352, the second electrode sheet 304 of the second wound electrode assembly 320 protrudes toward the outside of the wound electrode assembly 300 in the width direction W of the wound electrode assembly 300, so that the first electrode sheet 302 of the second wound electrode assembly 320 is different in shape from the second electrode sheet 304 of the first wound electrode assembly 310. The protective adhesive layer 340 is disposed between the first electrode sheet 302 of the second wound electrode assembly 320 and the second electrode sheet 304 of the first wound electrode assembly 310. In the present embodiment, the first electrode sheet 302 is a negative electrode sheet, and the second electrode sheet 304 is a positive electrode sheet. In the first region 352, the second electrode sheet 302 is closer to the inside of the wound electrode assembly 300 than the first electrode sheet 304, that is, the positive electrode sheet is closer to the inside of the wound electrode assembly 300 than the negative electrode sheet. Specifically, the protective adhesive layer 340 is in direct contact with and extends along the first electrode sheet 302 of the first wound electrode assembly 310, that is, the protective adhesive layer 340 is in direct contact with and extends along the negative electrode sheet. In the present embodiment, the positive electrode sheet is closer to the inside of the wound electrode assembly 300 than the negative electrode sheet, and the length of the protective adhesive layer 340 extends longer than in the embodiment shown in FIG. 3a.

In an embodiment, as shown in FIG. 3c, the protective adhesive layer 340 may extend outside the first region 352 along the first electrode sheet 302.

With reference to FIGS. 3a and 4a to 4d, the electrode tab 308 of the wound electrode assembly 300 is located in the first protrusion 332 in the thickness direction T of the wound electrode assembly 300. The first electrode sheet 302 includes a starting segment 3022, and the second electrode sheet 304 includes a starting segment 3042. The electrode tab 308 is disposed at the starting segment 3022 of the first electrode sheet 302 and the starting segment 3042 of the second electrode sheet 304. The starting segment 3022 of the first electrode sheet 302 is an empty foil region 3025, and the starting segment 3042 of the second electrode sheet 304 is an empty foil region 3045.

It should be understood that the first electrode sheet 302 includes a current collector 3021 and an active substance layer 3023, and the second electrode sheet 304 includes a current collector 3041 and an active substance layer 3043. The empty foil region 3025 of the first electrode sheet 302 is a region where the current collector 3021 is not covered with the active substance layer 3023, and the empty foil region 3045 of the second electrode sheet 304 is a region where the current collector 3041 is not covered with the active substance layer 3043.

Figure 6:
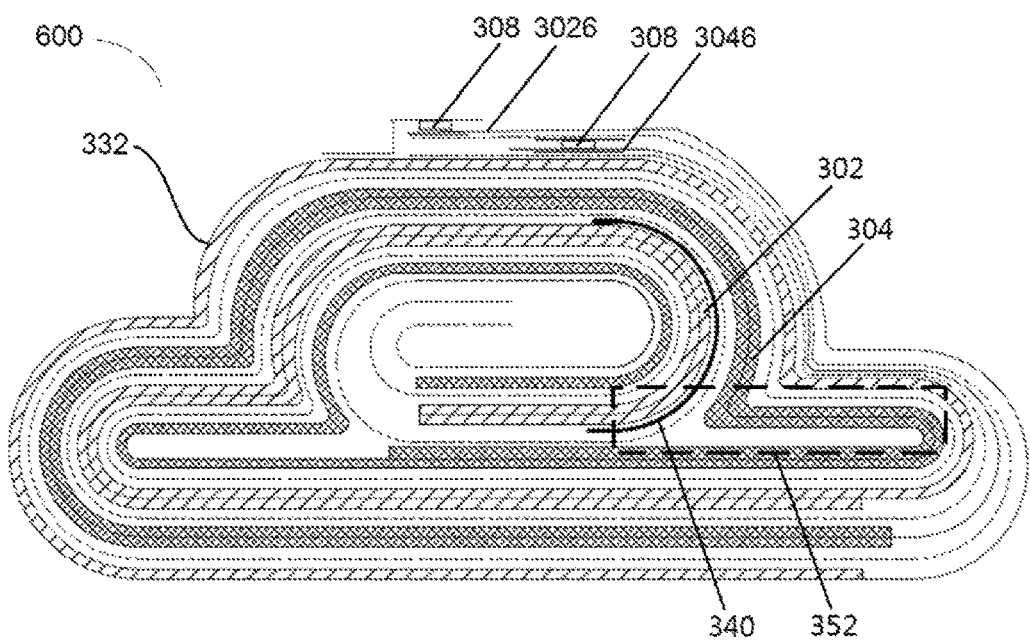
FIG. 6 is a structural scheme of a wound electrode assembly according to an embodiment of the present application.
Figure 7A:
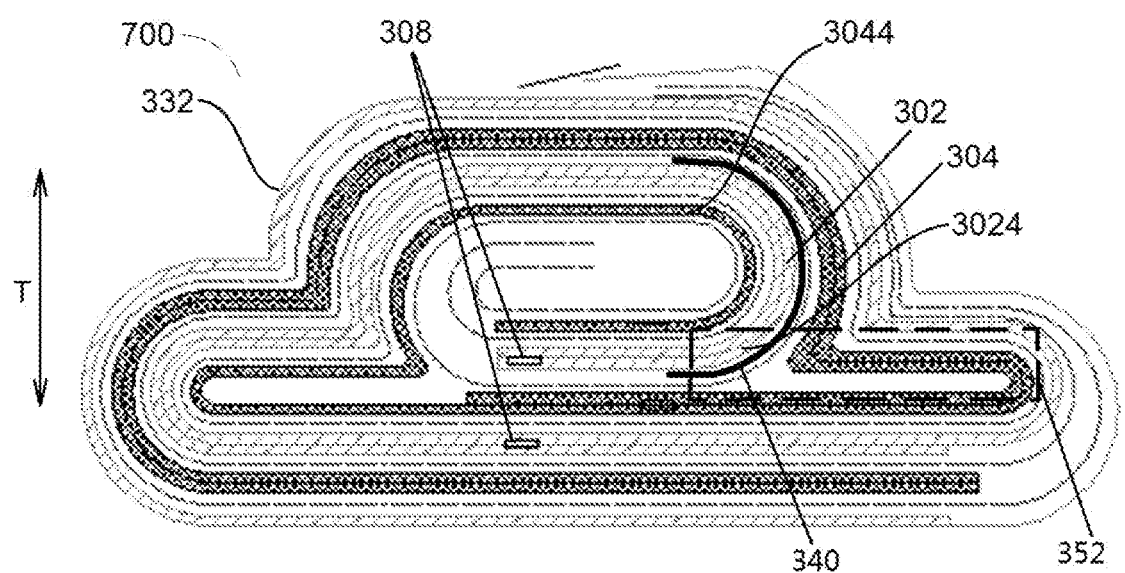
FIG. 7a is a structural scheme of a wound electrode assembly according to an embodiment of the present application.
Figure 7B:
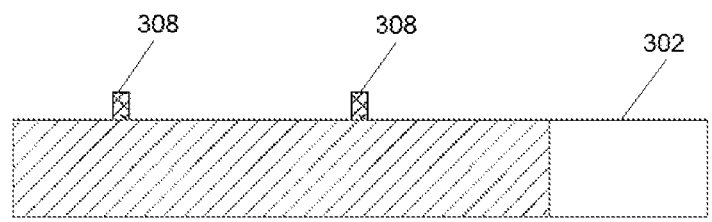
FIGS. 7b and 7c are structural schemes of two surfaces of a first electrode sheet of wound electrode assembly according to an embodiment of the present application.
Figure 7C:
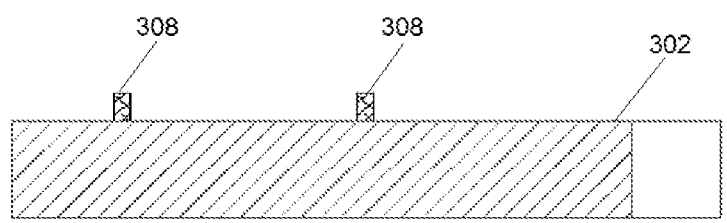
Figure 7D:
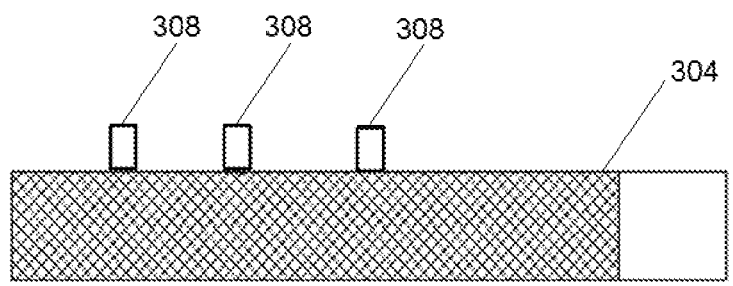
FIGS. 7d and 7e are structural schemes of two surfaces of a second electrode sheet of wound electrode assembly according to an embodiment of the present application.
Figure 7E:
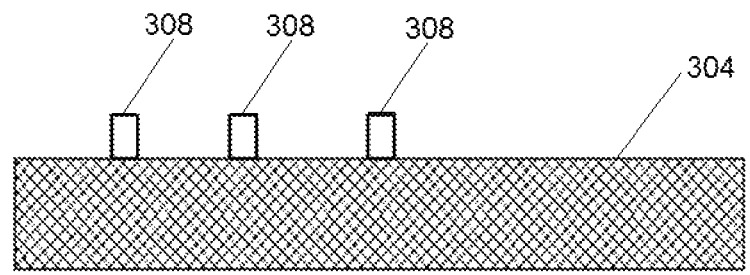

With reference to FIG. 6, the electrode tab 308 of the wound electrode assembly 600 is located within the first protrusion 332, and the electrode tab 308 is disposed at trailing portions 3026, 3046 of the wound electrode assembly 600, which makes the size of the first protrusion 332 and the width of the electrode tab 308 not limited, and further makes the charge and discharge magnification of the wound electrode assembly 600 not limited.

With reference to FIGS. 7a to 7e, in the thickness direction T of the wound electrode assembly 700, the electrode tab 308 of the wound electrode assembly 700 is located in the first protrusion 332. Specifically, the first electrode sheet 302 includes a winding segment 3024 and a plurality of electrode tabs 308 disposed on the winding segment 3024, and the second electrode sheet 304 includes a winding segment 3044. Such a multi-tab structure facilitates the power performance improvement of the wound electrode assembly.

Figure 8:
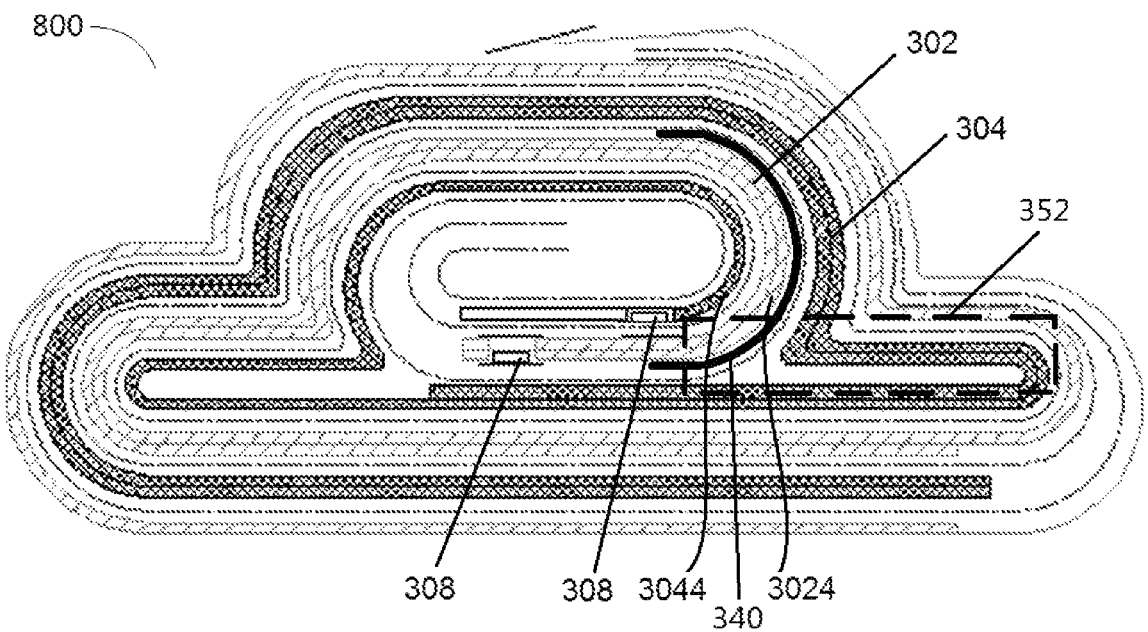
FIG. 8 is a structural scheme of a wound electrode assembly according to an embodiment of the present application.

With reference to FIG. 8, the electrode tabs 308 of the wound electrode assembly 800 is disposed on a head segment of the winding segment 3024 of the first electrode sheet 302 and a head segment of the winding segment 3044 of the second electrode sheet 304, therefore orientation and ED are improved.

Figure 9:
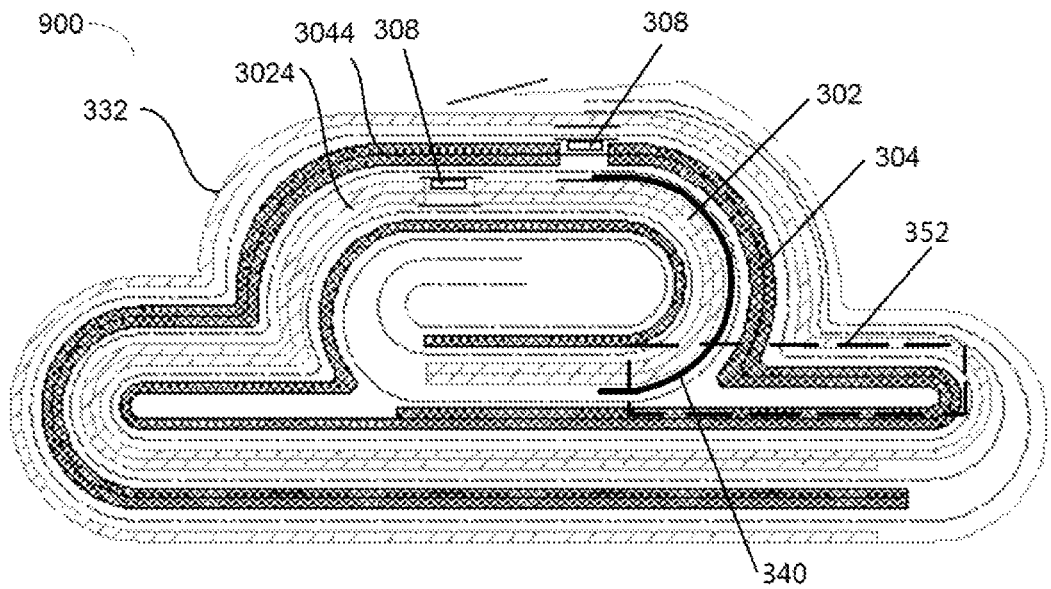
FIG. 9 is a structural scheme of a wound electrode assembly according to an embodiment of the present application.

With reference to FIG. 9, the electrode tabs 308 of the wound electrode assembly 900 is disposed on the winding segment 3024 of the first electrode sheet 302 and the winding segment 3044 of the second electrode sheet 304, and are located within the first protrusion 332. Thereby, it is possible to facilitate the fast charging performance and the ED lifting of the wound electrode assembly.

Figure 10A:
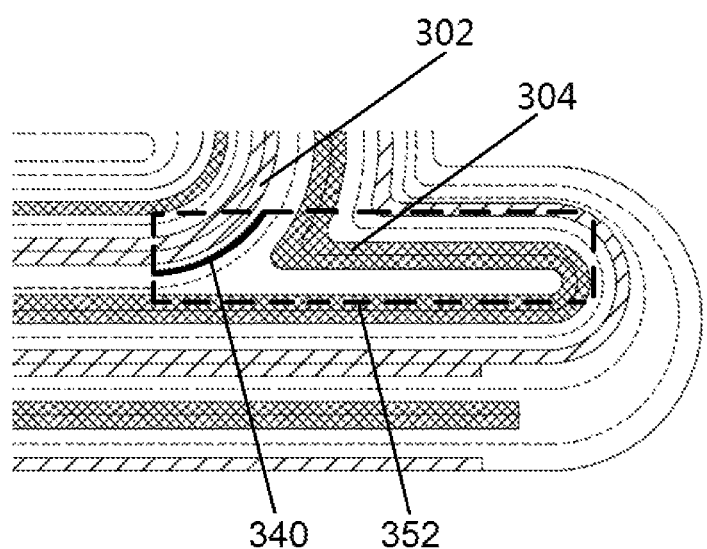
FIGS. 10a and 10b are structural schemes of a first region of a wound electrode assembly according to various embodiments of the present application.
Figure 10B:
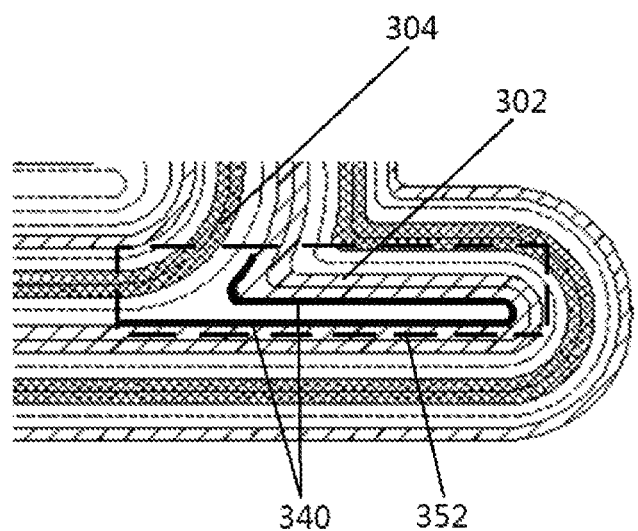

Here, in some embodiments, the protective adhesive layer 340 extends to the outside of the first region 352, as shown in FIGS. 6, 7a, 8 and 9. In the first region 352, the second electrode sheet 304 of the second wound electrode assembly 320 is different from the first electrode sheet 302 of the first wound electrode assembly 310 in shape. In some embodiments, as shown in FIG. 10a, similar to FIG. 3a, when the first electrode sheet 302 is a negative electrode sheet and the second electrode sheet 304 is a positive electrode sheet, and the first electrode sheet 302 is closer to the inside of the wound electrode assembly 300 than the second electrode sheet 304 in the first region 352, the protective adhesive layer 340 may extend along the first electrode sheet 302 only within the first region 352. In some embodiments, as shown in FIG. 10b, similar to FIG. 3b, when the first electrode sheet 302 is a negative electrode sheet and the second electrode sheet 304 is a positive electrode sheet, and the second electrode sheet 304 is closer to the inside of the wound electrode assembly 300 than the first electrode sheet 302 in the first region 352, the protective adhesive layer 340 extends along the first electrode sheet 302 within the first region 352.

Figure 11A:
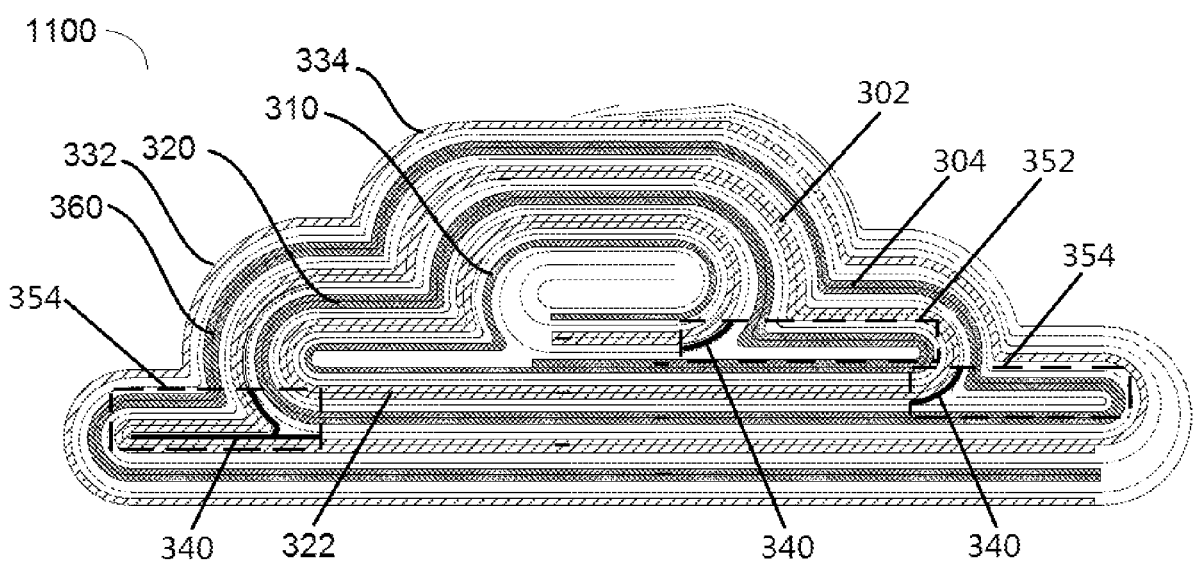
FIGS. 11a, 11b, 12 and 13 are structural schemes of wound electrode assemblies according to various embodiments of the present application.

With reference to FIG. 11a, the wound electrode assembly 1100 further includes a third wound electrode assembly 360 wrapping the second wound electrode assembly 320, the second wound electrode assembly 320 includes a first flat portion 322. Specifically, the first protrusion 332 further has a second protrusion 334 on a surface away from the first flat portion 322, and is between the first flat portion 322 and the second protrusion 334. It should be understood that FIG. 11a illustrates the embodiment the wound electrode assembly includes two protrusions, but the number and position of the protrusions may be configured depending on the particular application. Thereby, the better utilization of the profiled space reserved for the wound electrode assembly may be achieved, thereby increasing the energy density of the wound electrode assembly.

Figure 11B:
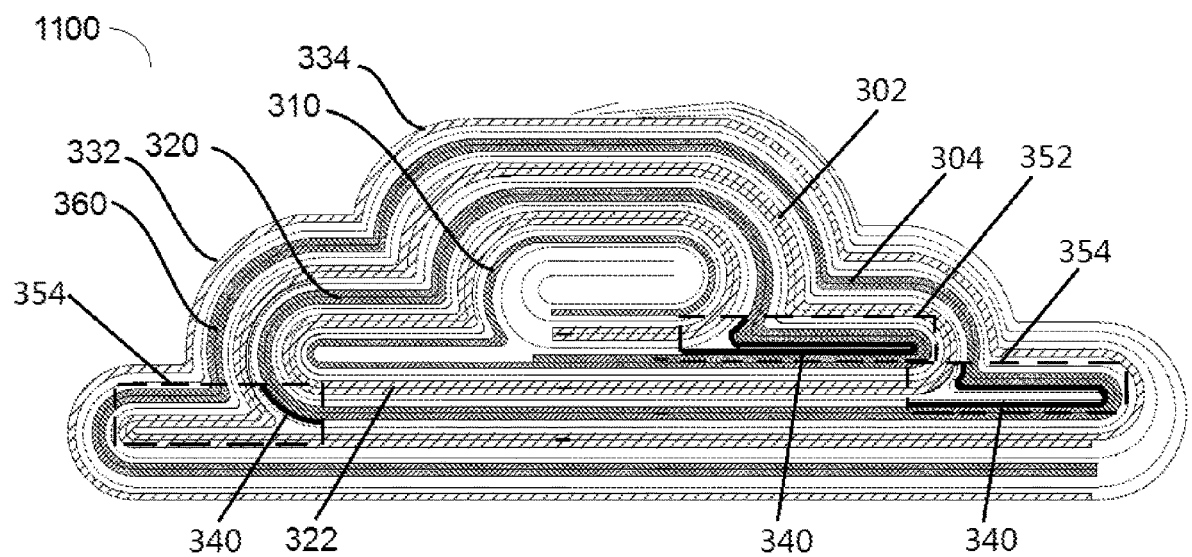

With reference to FIGS. 11a and 11b, in the first region 352 of the wound electrode assembly 1100, the second wound electrode assembly 320 is different in shape from the first wound electrode assembly 310, and the protective adhesive layer 340 is disposed. In the second region 354 of the wound electrode assembly 1100, the third wound electrode assembly 360 is different in shape from the second wound electrode assembly 320, and the protective adhesive layer 340 is also disposed. In an embodiment, as shown in FIG. 11a, the protective adhesive layer 340 extends along the first electrode sheet 302 in the first region 352 and the second region 354. In an embodiment, as shown in FIG. 11b, the protective adhesive layer 340 extends along the second electrode sheet 304 in the first region 352 and the second region 354.

Figure 12:
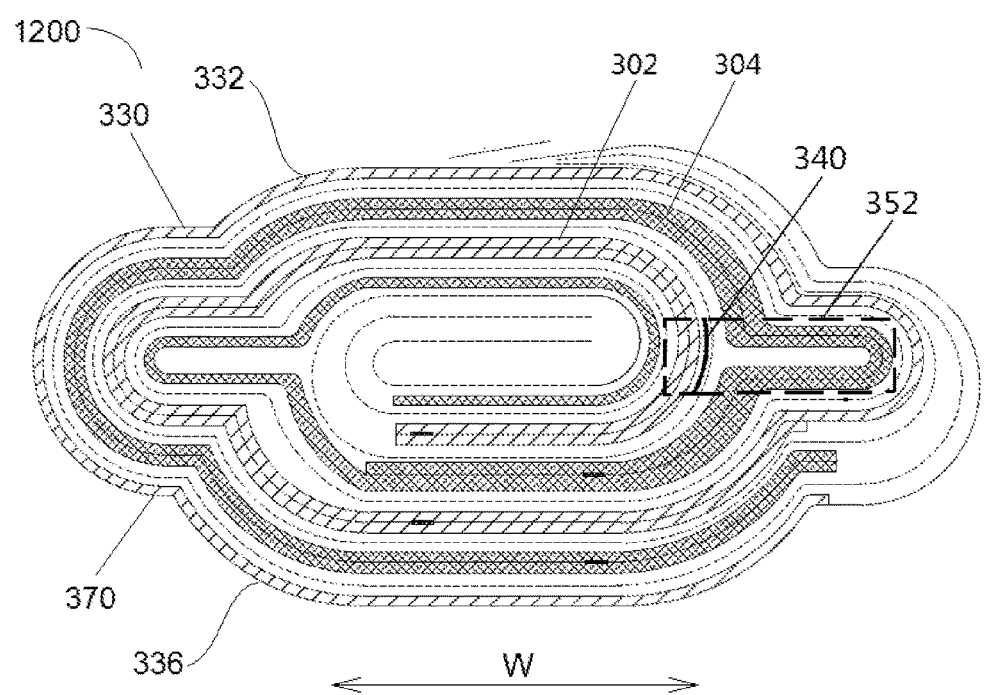

With reference to FIG. 12, the wound electrode assembly 1200 further includes a second surface 370 disposed opposite the first surface 330 and having a third protrusion 336. The first protrusion 332 may be disposed corresponding to the third protrusion 336 in the width direction W of the wound electrode assembly 1100. In an embodiment, the first protrusion 332 and the third protrusion 336 may be respectively located at both ends of the wound electrode assembly in the width direction W of the wound electrode assembly 1200. With such configuration of the positions of the first protrusion 332 and the third protrusion 336, the better utilization of the profiled space reserved for the wound electrode assembly may be achieved, thereby increasing the energy density of the wound electrode assembly.

In addition, in the first region 352 of the wound electrode assembly 1200, the second wound electrode assembly 320 is different in shape from the first wound electrode assembly 310, and the protective adhesive layer 340 is disposed. In an embodiment, as shown in FIG. 12, the protective adhesive layer 340 may extend along the first electrode sheet 302 only within the first region 352. In an embodiment, the protective adhesive layer 340 may extend along the first electrode sheet 302 to the outside of the first region 352. In an embodiment, similar to FIG. 3b, when the first electrode sheet 302 is a negative electrode sheet and the second electrode sheet 304 is a positive electrode sheet, and the second electrode sheet 304 is closer to the inside of the wound electrode assembly 300 than the first electrode sheet 302 in the first region 352, the protective adhesive layer 340 extends along the first electrode sheet 302 within the first region 352.

With reference to FIGS. 3a, 6, 7a, and 8 to 11b in combination, in some embodiments, the first protrusion 332 is located at the center of the wound electrode assembly in the width direction of the wound electrode assembly.

Figure 13:
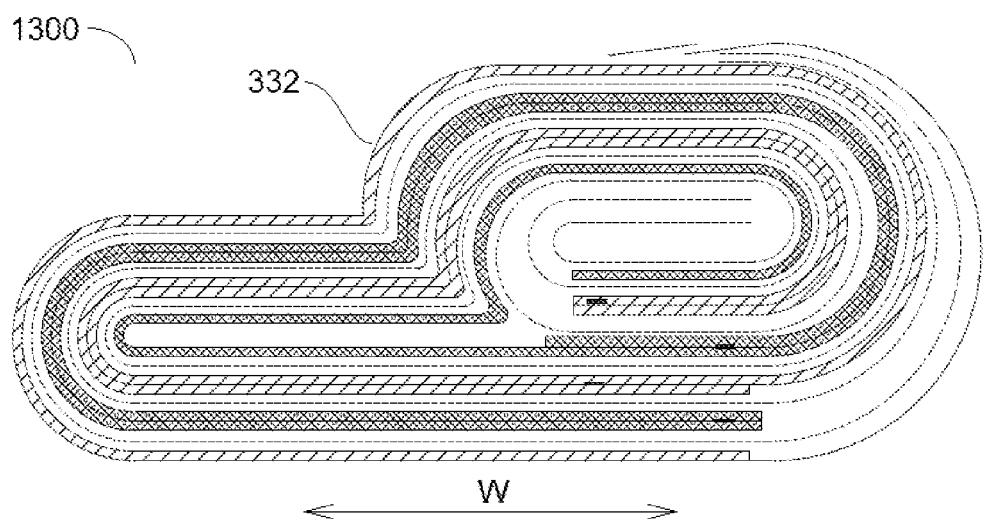

With reference to FIG. 13, the first protrusion 332 may be located at either end of the wound electrode assembly 1300 in the width direction W of the wound electrode assembly 1300. In the present embodiment, the wound electrode assembly 1200 does not include the protective adhesive layer 340. With such configuration of the position of the first protrusion 332, the better utilization of the shaped space reserved for the wound electrode assembly may be achieved, thereby increasing the energy density of the wound electrode assembly.

In the description of this specification, the terms "one embodiment", "some embodiments", "illustrative embodiments", "example", "specific examples", or "some examples", etc., means that the specific features, structures, materials, or characteristics described in connection with the embodiments or examples are included in at least one embodiment or example of the present application. In the present specification, the schematic representation of the above terms does not necessarily mean the same embodiment or example. Furthermore, the particular features, structures, materials, or characteristics described may be combined with each other in a suitable manner in any one or more embodiments or examples.

The above embodiments are only the preferred ones of the present application and are not intended to limit the present application. Although the preferred embodiments of the present application have been shown and described, it can be understood that a person skilled in the art can make various changes, modifications, substitutions and variations to the embodiments without departing from the principle and spirit of the present application; and the scope of the present application is defined by the attached claims and equivalents thereof.

What is claimed is:

1. A wound electrode assembly formed by winding a first electrode sheet, a second electrode sheet, and an isolating membrane disposed therebetween, wherein the wound electrode assembly comprises:
    a first surface having a first protrusion in a thickness direction of the wound electrode assembly;
    a first wound electrode assembly;
    a second wound electrode assembly wrapping the first wound electrode assembly, the first wound electrode assembly and the second wound electrode assembly sharing the first electrode sheet and the second electrode sheet and having the same winding direction wherein the second wound electrode assembly is different in shape from the first wound electrode assembly in a first region, and a protective adhesive layer is disposed at least in the first region; and
    an adhesive layer disposed between a portion of the first electrode sheet constituting the first wound electrode assembly and a portion of the isolating membrane constituting a transition from the first wound electrode assembly to the second wound electrode assembly, and/or between a portion of the second electrode sheet constituting the second wound electrode assembly and the portion of the isolating membrane constituting the transition from the first wound electrode assembly to the second wound electrode assembly.

2. The wound electrode assembly of claim 1, wherein the adhesive layer provides an adhesive force in the range of 4 N/m to 12 N/m.

3. The wound electrode assembly of claim 1, wherein a material of the adhesive layer comprises polyvinylidene fluoride or polyacrylate.

4. The wound electrode assembly of claim 1, wherein in the first region, the second electrode sheet of the second wound electrode assembly is different in shape from the first electrode sheet of the first wound electrode assembly, and the protective adhesive layer is disposed between the second electrode sheet of the second wound electrode assembly and the first electrode sheet of the first wound electrode assembly.

5. The wound electrode assembly of claim 4, wherein the first electrode sheet is a negative electrode sheet, and the second electrode sheet is a positive electrode sheet.

6. The wound electrode assembly of claim 5, wherein in the first region, the negative electrode sheet is closer to the inside of the wound electrode assembly than the positive electrode sheet.

7. The wound electrode assembly of claim 5, wherein in the first region, the positive electrode sheet is closer to the inside of the wound electrode assembly than the negative electrode sheet.

8. The wound electrode assembly of claim 5, wherein in the first region, the protective adhesive layer is in direct contact with and extends along the negative electrode sheet.

9. The wound electrode assembly of claim 1, wherein an electrode tab of the wound electrode assembly is located in the first protrusion in a thickness direction of the wound electrode assembly.

10. The wound electrode assembly of claim 9, wherein each of the first electrode sheet and the second electrode sheet both comprises a starting segment and a winding segment, the electrode tab is disposed in the winding segment of at least one of the first electrode sheet and the second electrode sheet, and at least one of the first electrode sheet and the second electrode sheet comprises a plurality of electrode tabs.

11. The wound electrode assembly of claim 9, wherein each of the first electrode sheet and the second electrode sheet comprises a starting segment, and the electrode tab is disposed at the starting segment of the first electrode sheet and the starting segment of the second electrode sheet; wherein the starting segment of the first electrode sheet is an empty foil region, and the starting segment of the second electrode sheet is an empty foil region.

12. The wound electrode assembly of claim 1, further comprising a third wound electrode assembly wrapping the second wound electrode assembly, wherein the second wound electrode assembly comprises a first flat portion, a second protrusion is located on a surface of the first protrusion away from the first flat portion, and the first protrusion is located between the first flat portion and the second protrusion;

wherein the third wound electrode assembly is different in shape from the second wound electrode assembly in a second region, and the protective adhesive layer is disposed in the second region.

13. The wound electrode assembly of claim 12, wherein in the second region, the protective adhesive layer is in direct contact with and extends along the first electrode sheet.

14. The wound electrode assembly of claim 12, wherein in the second region, the protective adhesive layer is in direct contact with and extends along the second electrode sheet.

15. The wound electrode assembly of claim 1, wherein the wound electrode assembly further comprises:
a second surface disposed opposite to the first surface and having a third protrusion.

16. The wound electrode assembly of claim 15, wherein the first protrusion is disposed corresponding to the third protrusion in a width direction of the wound electrode assembly.

17. The wound electrode assembly of claim 15, wherein the first protrusion and the third protrusion are respectively located at both ends of the wound electrode assembly in a width direction of the wound electrode assembly.

18. The wound electrode assembly of claim 1, wherein the first protrusion is located at a center of the wound electrode assembly in the width direction of the wound electrode assembly.

19. The wound electrode assembly of claim 1, wherein the first protrusion is located at either end of the wound electrode assembly in the width direction of the wound electrode assembly.

* * * * *